US011496531B2

(12) United States Patent
Haun et al.

(10) Patent No.: US 11,496,531 B2
(45) Date of Patent: Nov. 8, 2022

(54) SYSTEM AND METHOD TO IDENTIFY SECURE MEDIA STREAMS TO CONFERENCE WATCHERS IN SIP MESSAGING

(71) Applicant: Avaya Inc., Basking Ridge, NJ (US)

(72) Inventors: Christopher Haun, Richardson, TX (US); Carrie King, Dallas, TX (US); Tate Reimer, Wylie, TX (US); Thadeus Thigpen, Dallas, TX (US)

(73) Assignee: Avaya Inc., Durham, NC (US)

( * ) Notice: Subject to any disclaimer, the term of this patent is extended or adjusted under 35 U.S.C. 154(b) by 1002 days.

(21) Appl. No.: 14/044,477

(22) Filed: Oct. 2, 2013

(65) Prior Publication Data

US 2015/0095420 A1    Apr. 2, 2015

(51) Int. Cl.
| | | |
|---|---|---|
| *G06F 15/16* | (2006.01) | |
| *H04L 65/403* | (2022.01) | |
| *H04L 65/4038* | (2022.01) | |
| *H04L 65/1083* | (2022.01) | |
| *H04L 9/40* | (2022.01) | |
| *H04L 65/1104* | (2022.01) | |

(52) U.S. Cl.
CPC ............ *H04L 65/403* (2013.01); *H04L 63/20* (2013.01); *H04L 65/1083* (2013.01); *H04L 65/1104* (2022.05); *H04L 65/4038* (2013.01); *H04L 65/4046* (2013.01)

(58) Field of Classification Search
CPC ...................................................... H04L 65/403
USPC ......................................................... 709/204
See application file for complete search history.

(56) References Cited

U.S. PATENT DOCUMENTS

| | | | | |
|---|---|---|---|---|
| 7,899,170 | B2* | 3/2011 | Jeong ..................... | H04N 7/152 709/204 |
| 8,228,861 | B1* | 7/2012 | Nix ..................... | H04L 65/1069 370/329 |
| 2006/0245378 | A1* | 11/2006 | Jeong ................... | H04Q 3/0045 370/261 |
| 2007/0097886 | A1* | 5/2007 | Schwagmann ....... | H04L 12/189 370/329 |
| 2008/0025223 | A1* | 1/2008 | Karacali-Akyamac ..................... H04L 41/12 370/241 |
| 2008/0025516 | A1* | 1/2008 | Masuhiro ............ | H04L 63/0428 380/279 |

(Continued)

OTHER PUBLICATIONS

Rosenberg, et al.; "A Session Initiation Protocol (SIP) Event Package for Conference State"; Network Working Group, RFC 4575; Standards Track; Aug. 2006; The Internet Society.

(Continued)

*Primary Examiner* — Suraj M Joshi
*Assistant Examiner* — Joel Mesa (57) ABSTRACT

System and method to send security status notifications within a SIP conference. A SIP conference server receives a from a SIP conference client a request for a SIP NOTIFY message, creates a SIP NOTIFY message including information about security status of a conference resource, and sends the SIP NOTIFY message to all SIP conference subscribers. Subscribers parse the NOTIFY message to find and save security status about individual links or the entire conference. The NOTIFY message may be sent in response to a SUBSCRIBE message or other client request. The security status may include a binary indicator and/or a security protocol.

17 Claims, 4 Drawing Sheets

(56) References Cited

U.S. PATENT DOCUMENTS

| | | | | |
|---|---|---|---|---|
| 2009/0313698 | A1* | 12/2009 | Wahl | H04L 63/1416 707/999.2 |
| 2010/0257365 | A1* | 10/2010 | Anchan | H04L 63/068 713/171 |
| 2014/0096198 | A1* | 4/2014 | Brunson | H04L 65/104 726/4 |
| 2015/0304288 | A1* | 10/2015 | Balasaygun | H04L 63/20 713/151 |

OTHER PUBLICATIONS

Cuervo, et al.; "Megaco Protocol Version 1.0"; Network Working Group, RFC 3015; Standards Track; Nov. 2000; The Internet Society.

Schulzrinne, et al.; Real Time Streaming Protocol (RTSP); Network Working Group, RFC 2326; Standards Track; Apr. 1998; The Internet Society.

Schulzrinne, et al.; "RTP: A Transport Protocol for Real-Time Applications"; Network Working Group, RFC 3550; Standards Track; Jul. 2003; The Internet Society.

Handley, et al.: "SDP: Session Description Protocol"; Network Working Group, RFC 2327; Standards Track; Apr. 1998; The Internet Society.

Roach; "Session Initiation Protocol (SIP)—Specific Event Notification"; Network Working Group, RFC 3265 Standards Track; Jun. 2002; The Internet Society.

Rosenberg, et al.; "SIP: Session Initiation Protocol"; Network Working Group, RFC 3261; Standards Track; Jun. 2002; The Internet Society.

Baugher, et al.; "The Secure Real-time Transport Protocol (SRTP)"; Network Working Group, RFC 3711; Standards Track; Mar. 2004; The Internet Society.

* cited by examiner

SYSTEM AND METHOD TO IDENTIFY SECURE MEDIA STREAMS TO CONFERENCE WATCHERS IN SIP MESSAGING

BACKGROUND

Field of the Invention

Embodiments of the present invention generally relate to conference-call systems, and in particular, to improving the support for secure media streams in a SIP-enabled conference.

Description of Related Art

An audio or video conference call provides an economical way for participants in multiple locations to participate in a meeting and be able to discuss topics of interest without requiring all the participants to be physically located in the same place for the meeting. In a typical conference call, some participants are located together in one location, i.e., co-located, while other participants at other locations are either alone or also in groups. In some conference calls, every participant is alone. As used herein and unless otherwise indicated, a conference call refers to a media session (e.g., a telephonic call or video call) with at least two conferencing nodes. A conferencing node, as used herein and unless otherwise indicated, refers to a conference-call location with one telecommunication device and at least one participant. More-complex conference calls include more participants, more conferencing nodes, or more of both.

Session Initiation Protocol ("SIP") supports the initiation, modification, and termination of media sessions between user agents ("UAs"). These sessions are managed by SIP dialogs, which represent a SIP relationship between a pair of user agents. Communications sessions with multiple participants, however, are more complicated. SIP can support many models of multi-party communications. One, referred to as loosely coupled conferences, makes use of multicast media groups. In the loosely coupled model, there is no signaling relationship between participants in the conference. There is no central point of control or conference server. Participation is gradually learned through control information that is passed as part of the conference (e.g., by use of the Real Time Control Protocol ("RTCP")). Loosely coupled conferences are easily supported in SIP by using multicast addresses within its session descriptions.

In another model, referred to as fully-distributed multiparty conferencing, each participant maintains a signaling relationship with the other participants, using SIP. There is no central point of control; it is completely distributed among the participants.

In another model, sometimes referred to as the tightly coupled conference, there is a central point of control (e.g., a conference server). Each participant (e.g., a client) connects to this central point. It provides a variety of conference functions, and may possibly perform media mixing functions as well. Tightly coupled conferences are not directly addressed by RFC-3261, although basic participation is possible without any additional protocol support.

Within the context of SIP, an events framework may be known as general mechanisms for subscribing to, and receiving notifications of, events within SIP networks. A package is known as a specific instantiation of an events framework for a well-defined set of events. For example, RFC-4575 defines a SIP event package for tightly coupled conferences.

Although a conference-call system generally efficiently transmits the voices or images of participants, there is other potentially useful information that is not typically transmitted by a conference-call system to all participants. For example, the media stream between two particular endpoints indicates whether the media is secure (e.g., whether the media stream uses RTP versus SRTP), and this information is used at a protocol level between affected participants, but this information is not distributed to each and every other conference participant.

For example, suppose a conference is formed between conference server "A" and clients "B" and "C," with the A-B link secure but the A-C link unsecure. A later-entering client "D" that enters a SIP conference would not receive an indication as to the security status of individual media (audio and/or video) streams of any or all of the participants in the conference (e.g., the A-B link and the A-C link). Additionally, the client "D" does not receive any indication as to the security of the conference media in whole, e.g., the level of security or encryption of the conference media. Thus, clients generally are unable to determine who is securely connected, which makes communication of sensitive information more difficult than if all clients were aware of the secure connection status of each client.

Providing security status information via media streams is not sufficient to provide the information for each client in a conference to every other client in the conference, because not all clients may be receiving each media stream associated with the conference. For example, some clients may be receiving an audio stream without the video stream, or a video stream without the audio stream.

Therefore, a need exists to provide security status information regarding conference calls, in a way that can be received by all conference participants, even if they are not receiving all of the media streams associated with the conference.

SUMMARY

Embodiments of the present invention generally relate to conference-call systems, and in particular, to improving the support for secure media streams in a SIP-enabled conference so that all conference participants may become aware of the security status of all media links used by the conference.

In one embodiment, a method is provided to send security status notifications within a SIP conference. A SIP conference server receives a from a SIP conference client a request for a SIP NOTIFY message, creates a SIP NOTIFY message including information about security status of a conference resource, and sends the SIP NOTIFY message to all SIP conference subscribers. Subscribers parse the NOTIFY message to find and save security status about individual links or the entire conference. The NOTIFY message may be sent in response to a SUBSCRIBE message or other client request. The security status may include a binary indicator and/or a security protocol.

In one embodiment, a system to send security status notifications of a SIP conference includes: a receiver configured to receive a request for a SIP NOTIFY message; a processor configured to create a SIP NOTIFY message comprising information about security status of a conference resource; and a transmitted configured to send the SIP NOTIFY message to all conference subscribers.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize secure conferencing.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein in connection with embodiments of the present invention, the term "contact" (as in "customer contact") refers to a communication from a customer or potential customer, in which a request is presented to a contact center. The request can be by way of any communication medium such as, but not limited to, a telephone call, e-mail, instant message, web chat, and the like.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

The terms "switch," "server," "contact center server," or "contact center computer server" as used herein should be understood to include a Private Branch Exchange ("PBX"), an Automated Contact Distribution ("ACD") system, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

One or more embodiments of the present invention may utilize Session Initiation Protocol ("SIP") as a communication protocol. SIP is a communications protocol that is known and described in Internet Engineering Task Force (IETF) Request For Comment ("RFC") 3261, the content of which is hereby incorporated by reference in its entirety. SIP is an open signaling protocol for establishing many kinds of real-time communication sessions. Examples of the types of communication sessions that may be established using SIP include voice, video, and/or instant messaging. SIP also facilitates peer-to-peer communication sessions. These communication sessions may be carried out on any type of communication device such as a personal computer, laptop computer, Personal Digital Assistant, telephone, mobile phone, cellular phone, or the like. One key feature of SIP is its ability to use an end-user's Address of Record ("AOR") as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Users or any other addressable entities in a SIP framework are identified by Universal Resource Identifiers ("URI"), which are sometimes also referred to as Universal Resource Locators ("URLs"). URI and URL may be used interchangeably herein unless a distinction is clearly intended by the usage. Each such Internet-style address (for example, sip:johndoe@avaya.com) maps into one or more Contacts, each of which typically represents a device or service at which the corresponding user may be reached. Examples are phones, desktop multimedia clients, instant message accounts, email accounts and so on. The SIP framework is responsible for routing a request for a peer-to-peer session addressed to a given URL to one or more appropriate contacts for that URL. The framework may utilize information about the preferences, presence and location of the user identified by the URL, to determine the most appropriate contacts. The protocol also provides mechanisms to specify the type of session that is requested as well as means to change session parameters.

The media stream(s) are communicated using a Real-time Transport Protocol ("RTP"), also known as RFC 3550 (formerly RFC 1889), for transporting real-time data and providing Quality of Service ("QoS") feedback.

SIP is not a vertically integrated communications system. SIP is rather a component that can be used with other IETF protocols to build a complete multimedia architecture. Typically, these architectures will include protocols such as RTP (RFC 3550) for transporting real-time data and providing QoS feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 2327) for describing multimedia sessions. Therefore, SIP should be used in conjunction with other protocols in order to provide complete services to the users. However, the basic functionality and operation of SIP does not depend on any of these protocols.

The Real-Time Transport Control Protocol ("RTCP") is a protocol that is known and described in Internet Engineering Task Force (IETF) Request For Comment RFC 3550. RTCP provides out-of-band statistics and control information for an RTP media stream. It is associated with RTP in the delivery and packaging of a media stream, but does not transport the media stream itself. Typically RTP will be sent on an even-numbered user datagram protocol ("UDP") port, with RTCP messages being sent over the next higher odd-numbered port. RTCP may be used to provide feedback on the quality of service ("QoS") in media distribution by periodically sending statistics information to participants in a streaming multimedia session. Systems implementing RTCP gather statistics for a media connection and information such as transmitted octet and packet counts, lost packet counts, jitter, and round-trip delay time. An application program may use this information to control quality of service parameters, for instance by limiting a flow rate or by using a different codec.

The Secure Real-time Transport Protocol ("SRTP") is a variation of RTP intended to provide encryption, message authentication and integrity, and replay protection to the RTP data in both unicast and multicast applications. SRTP can achieve high throughput and low packet expansion. SRTP can provide protection for heterogeneous environments (i.e., a mix of wired and wireless networks). SRTP is further described in RFC-3711, the entire content of which is hereby incorporated by reference.

Conference-call-specific parameters can be transmitted using the infrastructure described in RFC 3265, titled "Session Initiation Protocol (SIP)-Specific Event Notification," incorporated herein by reference in its entirety, which provides an extension to the basic SIP protocol. A SIP event package for certain conferences is described in SIP Event Package for Conference State (RFC-4575). RFC-4575 is hereby incorporated by reference in its entirety.

RFC-4575 describes a conference event package for tightly coupled conferences using the SIP events framework, along with a data format used in notifications for this package. RFC-4575 allows a user to subscribe to a conference. In SIP, conferences are represented by URIs. These URIs route to a SIP user agent, called a focus, that is responsible for ensuring that all users in the conference can communicate with each other. The focus has sufficient information about the state of the conference to inform subscribers about it. The conference package allows users to subscribe to a conference URI. Notifications are sent about changes in the membership of this conference and optionally about changes in the state of additional conference components.

Figure 1:
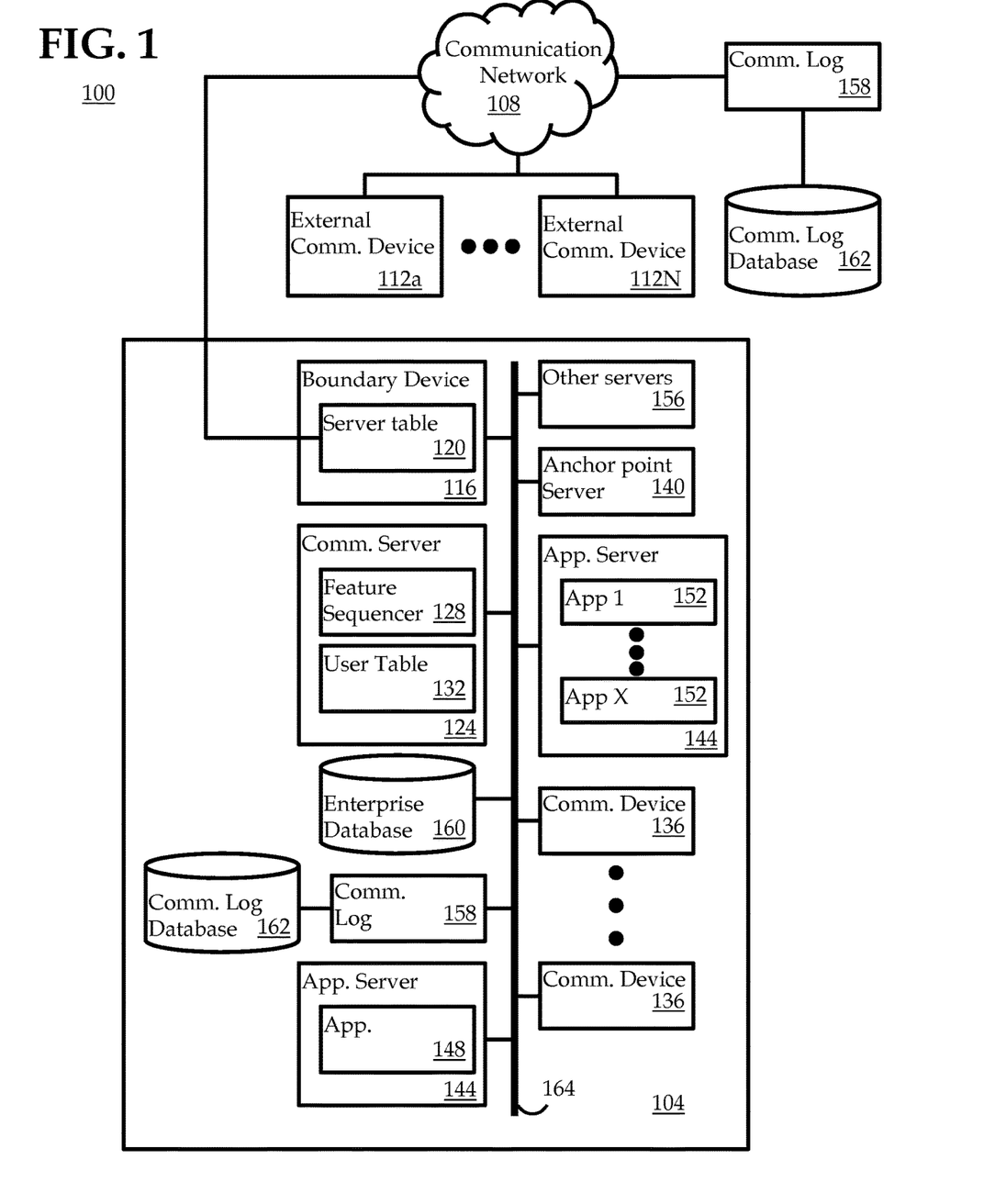
FIG. 1 is a block diagram depicting a block diagram of a system usable as a conferencing system, in accordance with an embodiment of the present invention.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112a . . . 112N. An individual but unspecified external communication device may be referred to as external communication device 112n or simply as external communication device 112. The external communication devices 112a . . . 112N are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof. Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112n, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but it is not necessarily required that the server be the same. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

Enterprise network 104 may include a conferencing server, such as server 144. A conference call between external communication devices 112a . . . 112N and the conferencing server, may be set up using SIP. The SIP-host logical entities that form end-points of the logical connections and generate and receive SIP messages are known as user agents (UAs).

Parameters of the SIP-established logical connection, also known as a session, can be placed in the header or the payload segment of a SIP message. Payload parameters may be encoded in any of a variety of formats, such as extended markup language ("XML"), SDP, and/or any other suitable protocol. Examples of encoded parameter information include the IP address and UDP port number to be used by the application traffic, which is called bearer traffic. Bearer traffic for conference calls is transmitted using RTP packets.

SIP provides extensive capabilities as well as flexibility in session control. For example, SIP messages can include information additional to that provided by standard SIP-message headers and payloads. SIP is a flexible protocol which allows for custom extensions to accommodate different situations. SIP messages may contain multiple sections, also known as "body parts," where, using a "handling" parameter, some sections may be defined as required and other sections may be defined as optional. If a SIP UA receives a SIP message with an optional section that the SIP UA does not understand, then the SIP UA ignores that optional section and processes the SIP message as if it did not contain that optional section. However, if a SIP UA receives a SIP message with a required section that the SIP UA does not understand, then the SIP UA should reject the message and respond with a suitable error code.

Figure 2:
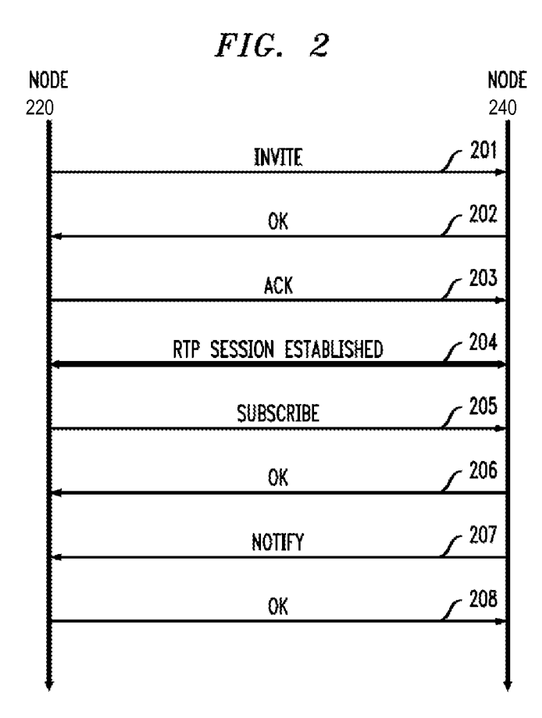
FIG. 2 illustrates at a high level of abstraction a message exchange for setting up a SIP conference call, in accordance with an embodiment of the present invention.

FIG. 2 shows an exemplary message-flow diagram for the establishment of a conference call involving two conferencing nodes 220, 240, where the vertical arrows indicate a message timeline. Conferencing node 220 may be an instance of a UA such as external communication device 112 of FIG. 1. Conferencing node 240 may be a focus or a conferencing server such as server 144. Conferencing node 220 initiates the conference call by sending SIP INVITE message 201 to conferencing node 240, where SIP INVITE message 201 includes a "conference" field value in an "Allow-Events" field (e.g., "Allow-Events: conference") of the header. It should be noted that the presence of the "Allow-Events" field indicates that the sending UA supports SIP NOTIFY and SUBSCRIBE messages, which are described in the above-referenced RFC 3265.

Conferencing node 240 responds to SIP INVITE message 201 with SIP OK response (also known as a "200" response since it is a SIP response whose status code is 200; the reason phrase of the response is "OK") 202, which includes a "conference" field value in an "Allow-Events" field of the OK response. Conferencing node 220 acknowledges OK response 202 with SIP ACK response 203. After conferencing node 240 receives SIP ACK response 203, RTP session 204 is established between the two conferencing nodes so that multimedia content, such as audio or video, can flow between the two conferencing nodes using RTP packets.

Conferencing node 220 subscribes to the conference events at conferencing node 240 by sending to conferencing node 240 a SIP SUBSCRIBE message 205 with a "conference" field value in an "Event" field. Conferencing node 240 responds with OK response 206 and SIP NOTIFY message 207 having a "conference" field value in an "Event" field in the header and an identification of and information about participant(s) at node 240 in the payload of SIP NOTIFY message 207. The participant identification and information may be encoded, for example, in XML format. Conferencing node 220 then responds with OK response 208. Conferencing node 240 subscribes to the conference events at conferencing node 220 by a corresponding interaction (not shown) where it receives an identification of and information about participant(s) at node 220. It should be noted that the SIP messages of the subscription of conferencing node 240 may be transmitted before, interspersed with, and/or after messages 205-208 are transmitted. The identification and information include, e.g., a participant ID, name, and title for each participant. Thereby, multiple enhanced conferencing nodes exchange participant identification and information for use in conjunction with participation identification in RTP packets exchanged during the conference call.

Embodiments in accordance with the present invention enhance RFC-4575 by adding information to the NOTIFY message that is sent to clients that subscribe to conference events. The additional information identifies each media stream that utilizes security encryption, and whether the conference as a whole is secure, i.e., that all media streams in the conference are securely encrypted. Enhancements to RFC-4575 include additions to the specification for individual media streams and for the entire conference. Conferences under RFC-4575 may also include a sidebar conference. If the specific media information is included in the sidebar description, the security information may be included as well in the NOTIFY messages related to sidebar conferences.

Individual Media Streams:

RFC-4575 associates each media stream with a respective media element. A media element includes an ID attribute and several child elements, each child element including a pairing of an attribute and a value of the attribute. Conventionally, media child elements defined by RFC-4575 include only attributes of "display-text," "type," "label," "src-id" and "status." Relevant portions of a conventional NOTIFY message are illustrated below:

```
<users state="full">
    <user state="full" entity="sip:UserA">
        <endpoint state="full" entity="UserA">
            <media id="111">
                <type>audio</type>
                .
                .
                .
            </media>
            <media id="222">
                <type>video</type>
                .
                .
                .
            </media>
            .
            .
            .
        </endpoint>
    </user>
</users>
```

Embodiments in accordance with the present invention enhance the media element of the NOTIFY message by providing one or more new attribute/value pairs. The new pairs may be used in order to identify which audio, video and/or web collaboration streams are securely encrypted. The new attribute/value pairs may be provided independently for each media stream, and provided to each user in the conference. The format for the new attribute/value pair is of the form:

```
condition=<{"secure","not_secure"}>
```

The braces {and} enclose a list of items from which one item is selected. The braces themselves are not included as part of the message. This format thus provides a binary indication of whether the associated media is secure or not secure. The allowable values for the condition attribute may be extended to include a type of encryption, rather than just a binary indication that the media is encrypted. The allowable values may be further extended to convey more information. In other embodiments, another attribute/value pair may be added to specify a selected encryption type.

The default condition is "not secure," i.e., the absence of this parameter in the NOTIFY message indicates that no security information is being provided for that media stream. If a SIP conference participant does not find this condition attribute/value pair in the NOTIFY message, the conference participant will assume that the media stream is not protected and treat it accordingly. The SIP conference participant cannot assume the media stream is secure unless security is specifically indicated. A SIP conference participant which parses the NOTIFY message can thus provide an indication to the end user of which media stream(s) in the conference are securely encrypted.

Entire Conference:

To identify whether the entire conference (all users' audio, video, and/or web collaboration streams) are securely encrypted, the "conference-state" element is enhanced to allow a new "secure-state-type" element. This element allows one or more elements for various media streams. An element for each media stream may be added. Presently, this includes "audio", "video, and "collab". Here, "collab" refers to sharing features of a conference, such as document sharing and a virtual white board. Additional element could be added in the future as additional media streams are supported. The format for these elements is of the form:

```
<audio>{"true", "false"}</audio>,
<video>{"true", "false"}</video>, and/or
<collab>{"true", "false"}</collab>
```

In some embodiments, if the NOTIFY message does not include one or more of these three elements, then the client receiving the NOTIFY message cannot make a decision regarding the collective conference security of the missing media type (i.e., audio, video, or collab). In other embodiments, to determine the security state of the conference as a whole, the security status of all of the constituent media streams may be determined, and an inference made regarding the conference as a whole. For example, if all audios streams of an audio conference are secure, then the audio conference as a whole is secure. Or, if all except one audio streams are secure, then the audio conference as a whole is not secure. An icon or other indicator for each media stream for each user may be displayed.

In some embodiments, the sender of a NOTIFY message may include a security summary of the whole conference to possibly prevent the client from having to look at a security value for each media steam. For example, if a conference security state for audio is true, a client may assume all the individual audio streams are secure. However, the same is not true in reverse. For example, if the conference audio as a whole is not secure, that would only indicate that at least one audio stream is not secure, not that they are all not-secure. So, the value of the conference indicator may be true if and only if all of the constituent media streams it is summarizing are secure.

The client may still parse all of the endpoint entities as described above for individual media streams, and combine all the data to determine whether each of the audio, video, and/or collaboration streams are secure.

A relevant portion of the enhancements to a RFC 4575 SIP NOTIFY message body, which specifies the status of the entire conference and for media streams "111" and "222," is shown below in italic:

```
<conference-state>
    <ns_var2:secure-state-type>
        <ns_var2:audio>true</ns_var2:audio>
        <ns_var2:video>true</ns_var2:video>
        <ns_var2:collab>true</ns_var2:collab>
    </ns_var2:secure-state-type>
</conference-state>
<users state="full">
    <user state="full" entity="sip:UserA">
        <endpoint state="full" entity="UserA">
            <media id="111" ns_var2:condition="secure">
                <type>audio</type>
                .
                .
                .
            </media>
            <media id="222" ns_var2:condition="secure">
                <type>video</type>
                .
                .
                .
            </media>
            .
            .
            .
        </endpoint>
    </user>
</users>
```

Per RFC-4575, notifications should be generated for the conference state when a new participant joins (i.e., gets "connected" to) or a participant leaves (i.e., gets "disconnected" from) the conference. Subject to a local focus policy, additional changes in participants' status, changes in their media types, and other optional information may be reported by the focus.

Embodiments may provide updates to conference participants via SIP NOTIFY messages if a conferencing node determines either that a new participant has joined the conference call at the conferencing node or that a previous participant has left the conference call at the conferencing node. Other conferencing nodes may respond with a SIP OK message indicating receipt and processing of the SIP NOTIFY message.

SIP expects packages such as RFC-4575 to specify how a subscriber processes NOTIFY requests in any package-specific ways, and in particular, how it uses the NOTIFY requests to construct a coherent view of the state of the subscribed resource. In some embodiments, the NOTIFY for the conference package may contain information only about those users whose state in the conference has changed. To construct a coherent view of the total state of all users, a subscriber to the conference package may need to combine NOTIFY messages received over time.

In order for conference participants to send a status inquiry and get the status of all links in the entire conference, a client may send another SUBSCRIBE to the conference and get full conference information.

Figure 3:
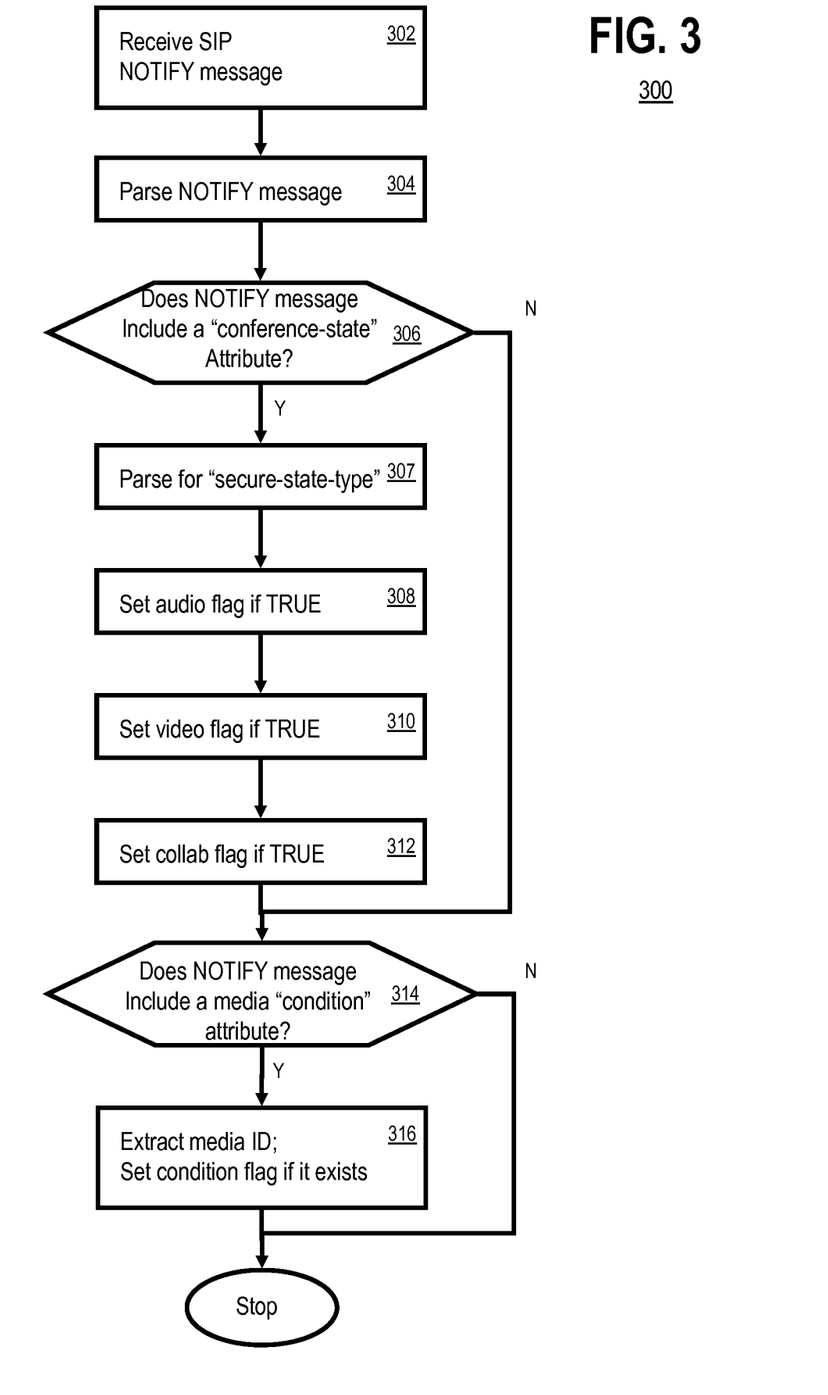
FIG. 3 is a flow chart of a process in accordance with an embodiment of the present invention.

FIG. 3 illustrates a process 300 in accordance with an embodiment of the present invention. Process 300 begins at step 302, at which a SIP UA participating in a conference call receives a SIP NOTIFY message. At the conclusion of step 302, control of process 300 passes to step 304.

Next, at step 304, step 304 is performed, at which the UA parses the received NOTIFY message. Parsing includes searching for and recognizing attribute/value pairs described herein. At the conclusion of step 304, control of process 300 passes to decision step 306.

Next, at decision step 306, the SIP UA determines whether the received NOTIFY message included a "conference-state" attribute. If the result of decision step 306 is negative, then control of process 300 passes to step 314. If the result of decision step 306 is positive, then control of process 300 passes to step 307.

Next, at step 307, the "conference-state" attribute is further parsed by the SIP UA to detect the presence of the "secure-state-type" attribute. At the conclusion of step 307, control of process 300 passes to step 308.

At step 308, the "conference-state" attribute is further parsed by the SIP UA to detect the presence of one or more of attributes "audio," "video," and/or "collab." The parsing may be extended to other types of media streams. As illustrated in FIG. 3, at step 308 the UA tests for the presence of the "audio" flag, and if found will set a corresponding flag to a true state. Control of process 300 then transitions to step 310 at which the UA tests for the presence of the "video" flag, and if found will set a corresponding flag to a true state. Control of process 300 then transitions to step 312 at which the UA tests for the presence of the "collab" flag, and if found will set a corresponding flag to a true state. However, embodiments of process 300 are not limited to this order of testing, and may test for the flags in any order. At the conclusion of step 312, control of process 300 passes to step 314.

Next, at decision step 314, the SIP UA determines whether the received NOTIFY message included a media "condition" attribute. If the result of decision step 314 is negative, then process 300 stops. If the result of decision step 314 is positive, then control of process 300 passes to step 316.

Next, at step 316, the SIP UA parses the NOTIFY message in order to extract the media ID. The value of the condition flag is then extracted by the SIP UA, and a flag associated with the extracted media ID is set according to the value of the flag detected. At the completion of step 316, control of process 300 ends.

Figure 4:
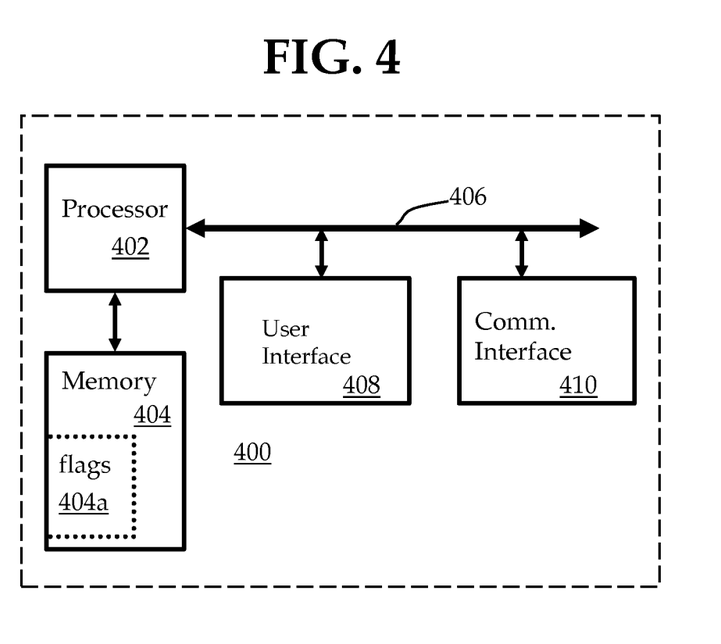
FIG. 4 is a simplified block diagram of a SIP-enabled UA in accordance with an embodiment of the present invention.

FIG. 4 illustrates a SIP UA 400 that is enabled in accordance with an embodiment of the present invention. UA 400 includes a processor 402 coupled to a memory 404. Memory 404 may be adapted to store flags 404a. Flags 404a may be useful to store the results of parsing NOTIFY messages received by UA 400, including security status of individual links and the entire conference. UA 400 further includes a user interface 408 and communication interface 410, both interconnected with processor 402 by use of bus 406.

Embodiments of the invention have been described for which security information about conference-call media streams or the conference itself is transmitted using SIP NOTIFY messages. The disclosure herein is not limited only to this transmission mechanism. In an alternative embodiment, the information may be transmitted using another type of SIP message.

Embodiments of the present invention include a system having one or more processing units coupled to one or more memories. The one or more memories may be configured to store software that, when executed by the one or more processing unit, allows practice of embodiments described herein, at least by use of processes described herein, including at least in FIG. 3, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A method to send security status notifications of a conference in a session initiation protocol (SIP) framework, comprising:
   receiving, at a conference server, from a conference client, a request for a SIP message;
   creating, by the conference server, a SIP message comprising information about a security status of an entire conference, wherein the conference comprises a plurality of media streams, and wherein the information about the security status indicates which of the plurality of media streams are encrypted; and
   sending, by the conference server, the created SIP message to all conference clients,
   wherein:
      when all of the plurality of media streams are encrypted, the information about the security status indicates that the entire conference is secure; and
      when at least one of the plurality of media streams is not encrypted, the information about the security status indicates that the entire conference is not secure.

2. The method of claim 1, wherein a conference resource comprises a link between the conference server and a conference client, and wherein the information about the security status indicates whether the link is encrypted.

3. The method of claim 1, wherein the request for the SIP message is caused by a change in membership of the conference.

4. The method of claim 1, wherein sending the SIP message comprises sending a second SIP message based on a changed status of access rights for a conference resource, the second SIP message comprising changed access right information for the conference resource.

5. The method of claim 1, wherein the information about the security status comprises a binary security indicator.

6. The method of claim 1, wherein the information about the security status comprises an indicator of a security protocol used by a conference resource.

7. The method of claim 1, wherein the information about the security status comprises information having an attribute-based format.

8. The method of claim 1, wherein the SIP message comprises a SIP NOTIFY message.

9. A method to receive security status notifications of a conference in a session initiation protocol (SIP) framework, comprising:
   sending, from a conference client, to a conference server, a request for a SIP message; and
   receiving, from the conference server, a SIP message comprising information about a security status of an entire conference, wherein the conference comprises a plurality of media streams, and wherein the information about the security status indicates which of the plurality of media streams are encrypted, wherein the SIP message is sent to all conference clients,
   wherein:
      when all of the plurality of media streams are encrypted, the information about the security status indicates that the entire conference is secure; and
      when at least one of the plurality of media streams is not encrypted, the information about the security status indicates that the entire conference is not secure.

10. The method of claim 9, wherein a conference resource comprises a link between the conference server and a conference client, and wherein the information about the security status indicates whether the link is encrypted.

11. The method of claim 9, further comprising:
   parsing the SIP message to extract an attribute related to a conference resource and a value of the attribute; and
   updating, in memory, a status related to the conference resource based upon the value of the attribute.

12. The method of claim 9, wherein the information about the security status comprises a binary security indicator.

13. The method of claim 9, wherein the information about the security status comprises an indicator of a security protocol used by a conference resource.

14. A system to send security status notifications of a conference in a session initiation protocol (SIP) framework, comprising:
- a receiver to receive a request for a SIP message;
- a processor coupled to memory, wherein the processor executes software stored in memory to create a SIP message comprising information about a security status of an entire conference, wherein the conference comprises a plurality of media streams, and wherein the information about the security status indicates which of the plurality of media streams are encrypted; and
- a transmitter to send the SIP message to all conference clients, wherein:
- when all of the plurality of media streams are encrypted, the information about the security status indicates that the entire conference is secure; and
- when at least one of the plurality of media streams is not encrypted, the information about the security status indicates that the entire conference is not secure.

15. The system of claim 14, wherein a conference resource comprises a link between a conference server and a conference client, and wherein the information about the security status indicates whether the link is encrypted.

16. The system of claim 14, wherein the request for a SIP message is caused by a change in membership of the conference.

17. The system of claim 14, wherein the information about the security status comprises an indicator of a security protocol used by a conference resource.

* * * * *

UNITED STATES PATENT AND TRADEMARK OFFICE
CERTIFICATE OF CORRECTION

PATENT NO. : 11,496,531 B2
APPLICATION NO. : 14/044477
DATED : November 8, 2022
INVENTOR(S) : Christopher Haun et al.

It is certified that error appears in the above-identified patent and that said Letters Patent is hereby corrected as shown below:

On the Title Page

Item (57), in the abstract, Lines 2-3:
"A SIP conference server receives a from a SIP conference client" should read --A SIP conference server receives from a SIP conference client--

Signed and Sealed this
Eleventh Day of July, 2023

*Katherine Kelly Vidal*

Katherine Kelly Vidal
*Director of the United States Patent and Trademark Office*